United States Patent Office 3,544,792
Patented Dec. 1, 1970

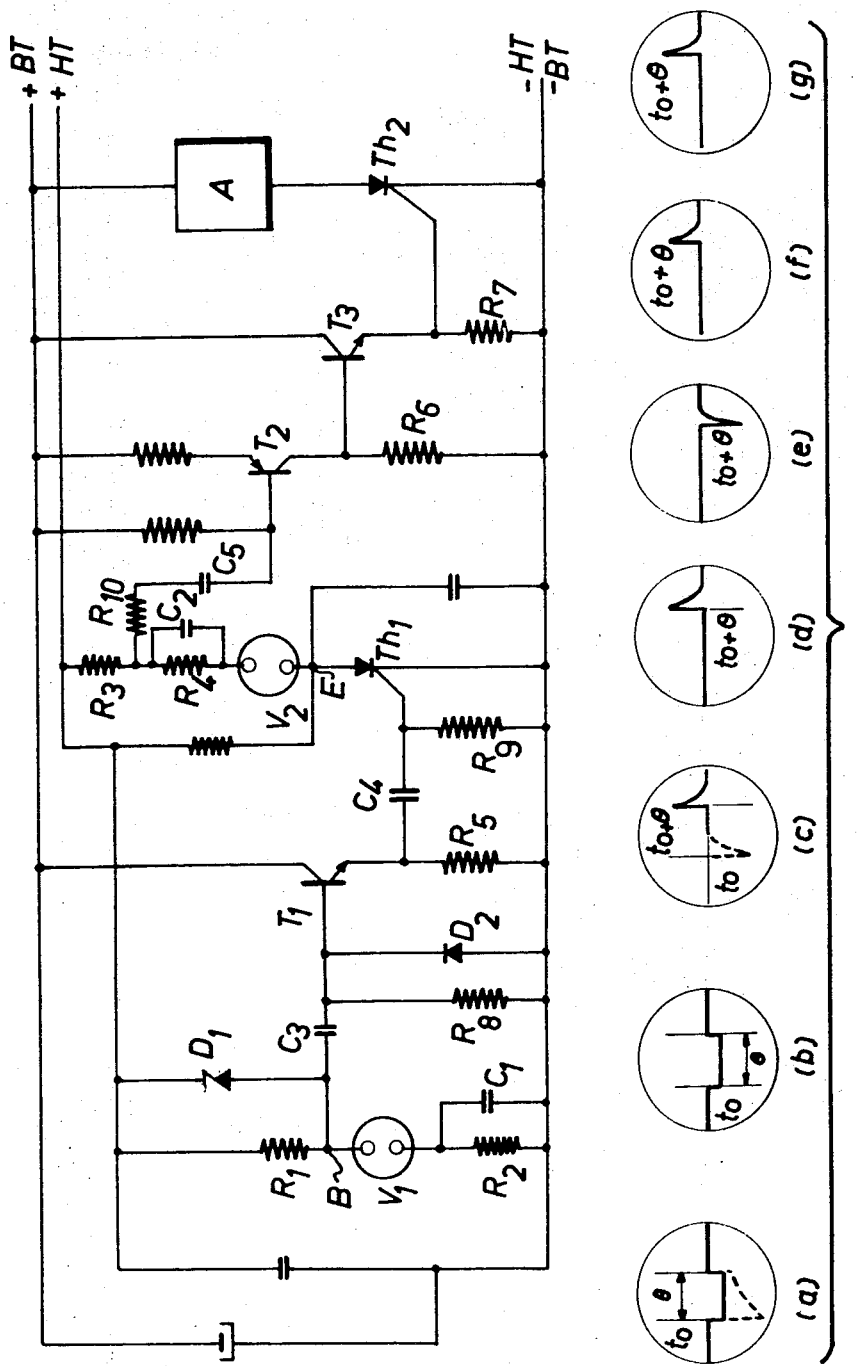

3,544,792
ULTRAVIOLET FLAME DETECTOR USING A TRIGGER CIRCUIT TO AVOID FALSE ALARMS
Marcel Charles Giltaire, Creil, France, assignor to Charbonnages de France, Paris, France, a public institution of France
Filed Nov. 27, 1968, Ser. No. 779,484
Claims priority, application France, Dec. 8, 1967, 131,625
Int. Cl. G08b *17/12, 29/00*
U.S. Cl. 250—83.3
10 Claims

ABSTRACT OF THE DISCLOSURE

A trigger circuit adapted to actuate a safety device upon the occurrence of a source of ultraviolet radiation, as for example a flame or spark, in a poorly lit area, such as a mine gallery. This trigger-circuit comprises two ultraviolet light detector tubes, the first one of which has voltage permanently applied across it while the second one has voltage applied to it at a time during the period that the first tube conducts or applied commencing at a time when the first tube stops conduction. It results therefrom that the second detector tube will only be triggered if the cause of the triggering of the first detector tube still exists when voltage is applied thereto, which eliminates any possibility of spontaneous working of the detector circuit assembly.

---

The present invention relates to apparatus including a triggering circuit adapted to actuate a safety or alarm device upon the occurrence of a source of ultraviolet radiation, and more particularly adapted to operate following the appearance of a flame or spark in a poorly lit location such as a mine gallery.

Photo-detector tubes sensitive to ultraviolet radiation having a wavelength falling within the range 2000–2900 A. have already been produced for this type of apparatus.

These detector tubes are very sensitive and very well adapted for use in underground mine workings because they have the advantage of being sensitive to the ultraviolet radiation emitted by a naked flame or by an electric spark, whilst at the same time being insensitive to the radiation emitted by flame lamps having protective glasses and by incandescent and fluorescent lamps.

Such tubes do however have the drawback that they are liable to operate spontaneously, independently of the occurrence of flames or sparks, the precise cause of this being still uncertain.

An object of the present invention is to provide an apparatus including a new trigger circuit using two detector tubes of the kind defined above which are not subject to spontaneous operation.

Another object of the invention is to provide a safety or alarm device incorporating the aforesaid trigger circuit.

The apparatus of the invention is characterised in that its trigger circuit comprises in any technically practicable combination:

a first detector tube with a voltage permanently applied across it,
a second detector tube normally having no voltage applied across it,
means for momentarily applying a voltage across the second detector tube at a time after the first tube starts conducting,
and means automatically to cause the two detector-tubes to stop conducting.

The safety or alarm apparatus of the invention is characterised in that it includes:

the triggering circuit defined above,
a safety or alarm device,
and means to actuate said safety or alarm device when said second detector tube starts to conduct.

Other characteristics and advantages of the present invention will appear from the following description with reference to the accompanying drawings in which:

FIG. 1 is a circuit diagram of one embodiment of safety or alarm apparatus of the invention, and FIG. 2 is a series of explanatory diagrams showing various phases of operation of the apparatus.

For the sake of simplicity, only those elements necessary for an understanding of the apparatus of the invention will be described.

In the circuit diagram $V_1$ and $V_2$ are two sensitive photoconductor tubes for detecting ultraviolet radiation in the 2000–2900 A. band, $\pm$HT is their high voltage D.C. supply source, $\pm$LT is the low voltage D.C. supply source for the transistor stages of the apparatus.

The negative poles of the HT and LT sources are connected together and constitute the frame of the apparatus.

Between the HT positive pole and the frame there can be distinguished two distinct circuits which, proceeding from the +HT to the frame:

one circuit comprises a resistance $R_1$, the tube $V_1$ and time constant circuitry $R_2C_1$,
the other comprises a resistance $R_3$ time constant circuitry $R_4$–$C_2$, the tube $V_2$, the anode-cathode circuit of a thyristor $Th_1$.

Between the positive pole of the LT source and the frame are:

the emitter-collector circuit of an NPN type transistor $T_1$, the load resistance of which is $R_5$,
the emitter-collector circuit of a PNP type transistor $T_2$, the load resistance of which is $R_6$,
the emitter-collector circuit of an NPN type transistor $T_3$, the load resistance of which is $R_7$,
the feed circuit of the safety or alarm device A, constituted by the anode-cathode circuit of a thyristor $Th_2$ the control electrode-cathode circuit of which is connected across $R_7$.

The base of T1 is connected to the point B common to $R_1$ and $V_1$ by means of a condenser $C_3$ constituting with the resistance $R_8$ a differentiator circuit.

A Zener diode $D_1$ is connected across $R_1$, the anode being connected to the end nearest to the point B. A diode $D_2$ is connected across $R_8$, the anode being connected to the frame.

The control electrode of the thyristor $Th_1$ is connected by means of a condenser $C_4$ to the emitter of $T_1$, and by means of a resistance $R_9$ to to the frame. The point common to $R_3$ and $R_4$ is connected to the base of $T_2$ by means of a resistance $R_{10}$ and a condenser $C_5$ connected in series.

It should be noted that in the rest condition the tubes $V_1$ and $V_2$, the transistors $T_1$, $T_2$, $T_3$ and the thyristors $Th_1$ and $Th_2$ are in the non-conducting state.

It follows that:

the tube $V_1$ has a voltage applied permanently across it,
the supply circuit for the tube $V_2$ is open, and the tube $V_2$ has no voltage across it,
the supply circuit for the safety or alarm device A is open.

The apparatus operates as follows:

When the tube $V_1$ starts to conduct (at the moment $t_0$ on the diagram $a$) the condenser $C_1$ charges.

The resistances $R_1$ and $R_2$ constitute a voltage divider, the potential at the point B falls suddenly when $V_1$ starts to conduct. If the Zener diode D, were not present, the variation in the value of the potential at B would have, according to the charge of $C_1$, the shape shown in broken lines in the diagram of $a$, the tube $V_1$ ceasing to conduct at the end of the time $\theta$.

The diode $D_1$ removes the tip from this pulse (portion of the diagram $a$ in heavy lines) so that the signal applied to the differentiator circuit $R_8$–$C_3$ has the shape of a negative rectangular signal (see the diagram $b$).

The differentiation of this rectangular signal causes a negative voltage pulse to appear, which corresponds to the leading edge of the rectangular signal whose tip has been removed by the diode $D_2$ (portion of the diagram $c$ in broken lines), and also a positive voltage pulse (portion of the diagram $c$ in heavy lines) corresponding to the trailing edge of the rectangular signal and which is applied at the base of $T_1$.

The latter starts momentarily to conduct. The positive voltage pulse appears across the resistance $R_5$ (diagram $d$) and is applied to the gate of the thyristor $Th_1$. The latter conducts for the duration of the above-mentioned positive pulse. It follows that the supply circuit to the tube $V_2$ is closed and that the tube $V_2$ has a voltage applied across it.

In summary in this particular embodiment, the blockage of the tube $V_1$ and the application of the voltage across the tube $V_2$ take place simultaneously.

Two circumstances can occur:

(1) The tube $V_1$ has triggered a false alarm: at the end of the time $\theta$ a voltage is applied across the tube, but the phenomenon which caused $V_1$ to start conducting has disappeared; the tube $V_2$ remains non-conducting and the thyristor $Th_1$ ceases to conduct.

(2) The tube $V_1$ has triggered because of the appearance of a flame: when a voltage is applied across the tube $V_2$, the flame causes the tube to start conducting in the same way as the tube $V_1$.

The capacitor $C_2$ charges and the negative voltage pulse (diagram $e$) appears across $R_3$ and causes the transistor $T_2$ momentarily to start conducting.

The positive voltage pulse then appears across $R_6$ (diagram $f$) and causes $T_3$ momentarily to start conducting.

The positive voltage pulse then appears across the resistance $R_7$ (diagram $g$) and is applied to the gate of the thyristor $Th_2$ which starts to conduct, thus closing the supply circuit to the alarm or triggering device A.

The combination $R_4$–$C_2$ ensures that the detector tube $V_2$ stops conducting in the same way that the combination $R_2$–$C_1$ acts on the tube $V_1$, as well as ensuring that $Th_1$ stops conducting.

In order to reblock the thyristor $Th_2$, it is only necessary to open manually or automatically the supply circuit to the alarm or safety device A by means of a switch (not shown) located before the thyristor $Th_2$.

It will be seen from the foregoing description that in order for the alarm or safety device to be actuated for a false alarm, the source of interference which causes the triggering of $V_1$ at the moment $t_0$ must be present at least at the moment $(t_0+\theta)$ and for the period of time during which the thyristor $Th_1$ is conducting, i.e. for the very short duration of the positive pulse corresponding to the trailing edge of the differentiated rectangular pulse defined above.

It will thus be seen that the probability of triggering for a false alarm is minimal.

During tests carried out by the applicant, an apparatus according to the invention placed for several months in lighting conditions normally existing in a room situated in daylight was not triggered off spontaneously.

Moreover, it has been seen that, during an observation period, the tube $V_1$ has a voltage applied across it but is not conducting, the tube $V_2$ has no voltage across it and the transistors $T_1$, $T_2$, $T_3$ are not conducting. It follows that the power consumption is nil and that if the HT and LT sources are incorporated electric batteries, the efficiency of the apparatus is only limited by the life of the batteries.

The safety or alarm apparatus according to the invention may have an acoustical or optical alarm device A.

It may also have a safety device causing, for example, the cutting off of the voltage applied across the grid supplying electric power to the area being watched, or causing the operation of water or inert dust barriers with a view to stopping the spread of a possible fire from the flame or spark detected by the triggering circuit.

In the latter application the triggering circuit according to the invention is particularly advantageous since, whilst retaining a high speed of action when necessary, it reduces almost to nil the number of triggerings for false alarms of widespread installations which would take a long time to set up again.

Clearly the present invention has been described purely by way of non-limitative example and any modifications of detail may be made thereto without departing from its scope.

I claim:

1. A trigger circuit adapted to actuate a safety or alarm device upon the appearance of a source of ultraviolet radiation such as a flame or spark in a badly lit location such as a mine tunnel, comprising a source of power, first tube means for detecting ultraviolet radiation connected to said power source with voltage permanently applied across it, second tube means for detecting ultraviolet radiation connected to said power source, circuit control means connected between said power source and said second tube means in a normally open condition to apply voltage across said second tube means after conduction by said first tube means and to automatically cause both of said tube means to cease conducting, and load means connected to said second tube means whereby said second tube means will only be triggered and actuate said load means if the cause of triggering of said first tube means still exists when said second tube means has voltage applied across it.

2. The trigger circuit in accordance with claim 1, further characterized by the trigger circuit having a frame, said power source including both a high voltage direct current input and a low voltage direct current input, both said tube means connected to said high voltage direct current input, said circuit control means and said load means being in transistorized form and connected to said low voltage direct current input, and the negative poles of both said high and low voltage inputs being connected to said frame of the trigger circuit.

3. The trigger circuit in accordance with claim 1, further characterized by said circuit control means to apply voltage across said second tube means after conduction by said first tube means including circuit means to apply the voltage across said second tube means at the time when said first tube means stops conducting.

4. The trigger circuit in accordance with claim 1, further characterized by said first and second tube means are photo-detector tubes sensitive to ultraviolet radiation of the wavelength within the band 2000 to 2900 A.

5. The trigger circuit in accordance with claim 1, further characterized by said load means being a safety device and including electrical means to operate said safety device when said second tube means starts to conduct.

6. Apparatus sensitive to the appearance of a source of ultraviolet radiation and adapted to function following the appearance of a flame or spark in a badly lit location such as a mine tunnel comprising
- a high voltage direct current electrical power source and a low voltage direct current electrical power source,
- first and second tube means for detecting ultraviolet radiation connected to said high voltage power source,
- transistorized circuit control means connected to said low voltage power source to momentarily apply a voltage across said second tube means after conduction by said first tube means and to automatically cause the two said tube means to cease conducting,
- transistorized load control means connected to said low voltage power source and to a load means to operate said load means when said second tube means starts to conduct.

7. Apparatus in accordance with claim 6, further characterized by
- said load control means including a thyristor,
- said load means connected across said low voltage power source through the anode-cathode circuit of said thyristor, the gate-cathode circuit of said thyristor connected to receive a positive pulse through said load control means when said second tube means is triggered.

8. Apparatus in accordance with claim 6, further characterized by
- said load means including means to cause the electrical energy supply grid of the location watched over by the apparatus to be disconnected.

9. Apparatus in accordance with claim 6, further characterized by
- said load means including means to stop the spread of a possible fire started by the flame or spark detected by the apparatus.

10. Apparatus in accordance with claim 6, further characterized by said load means being an alarm device.

References Cited
UNITED STATES PATENTS

| | | | |
|---|---|---|---|
| 3,286,093 | 11/1966 | Gilbert | 250—83.3 |
| 3,380,045 | 4/1968 | Lindberg | 340—227 |

JAMES W. LAWRENCE, Primary Examiner

M. J. FROME, Assistant Examiner

U.S. Cl. X.R.

250—83.6; 340—227, 228